United States Patent Office 3,543,383
Patented Dec. 1, 1970

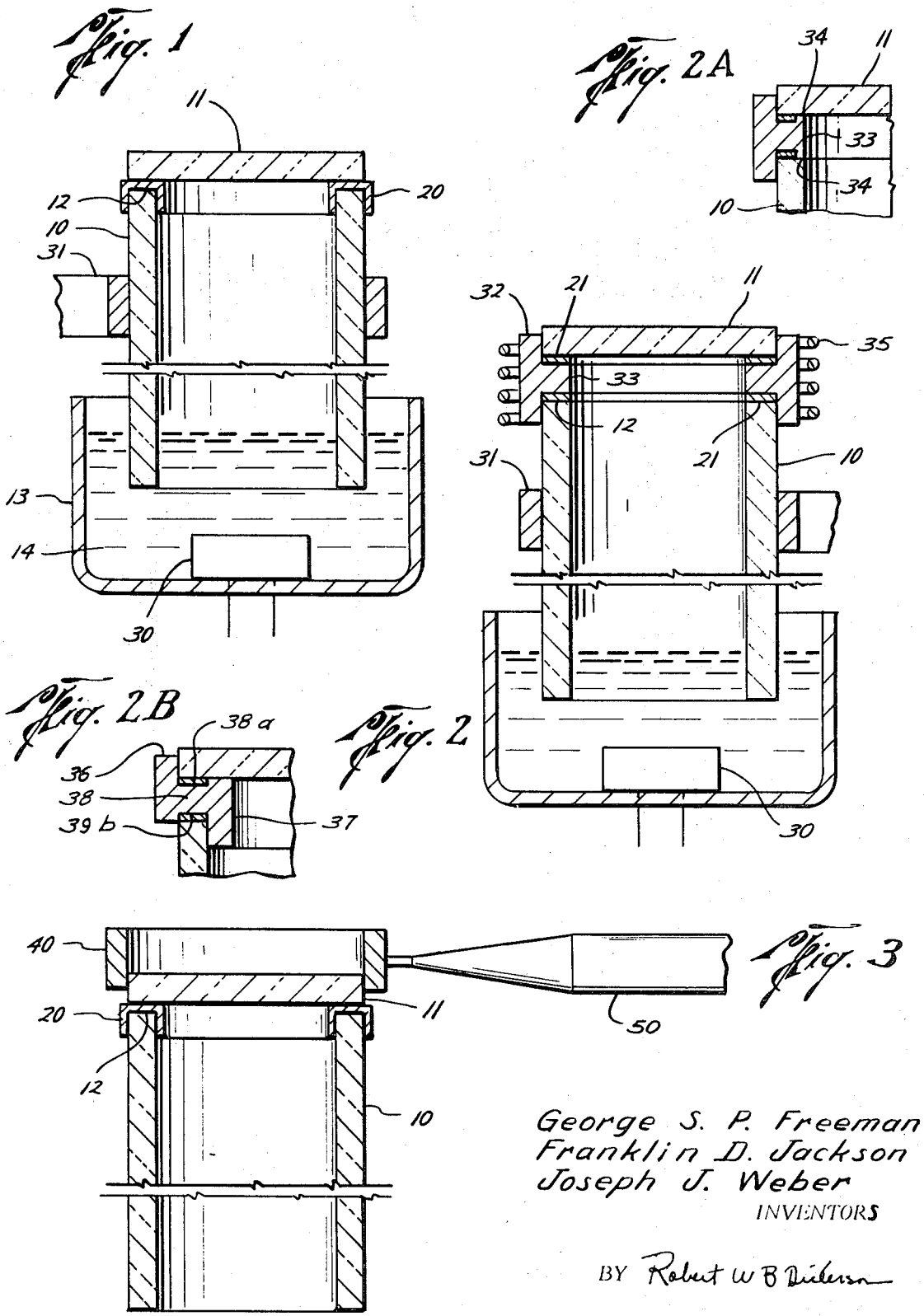

3,543,383
INDIUM SEAL
George S. P. Freeman, Middlesex, England, Franklin
D. Jackson, Garland, Tex., and Joseph J. Weber, Scottsdale, Ariz., assignors to General Electrodynamics Corporation, Garland, Tex., a corporation of Texas
Filed Feb. 20, 1967, Ser. No. 617,126
Int. Cl. B23k 21/00
U.S. Cl. 29—470.1                                2 Claims

ABSTRACT OF THE DISCLOSURE

This invention concerns a new and novel seal and method of forming such a seal. More specifically it concerns a seal adapted to be utilized with pick-up tubes of the type utilizing photoconductive material as a portion thereof. A supply of indium metal is provided intermediate a tube envelope and a face plate. Vibrational energy may then be applied to the device along with, in some instances, a sudden burst of heat to render fluid the indium, in order that surface film on the indium may be scraped away to assure intimate contact between the indium and the adjacent member.

In constructing such tubes, a vidicon being an example, difficulties have been encountered in uniformly providing a photoconductive material to a face plate and linking said face plate to an envelope normally provided said tube.

---

The prior art has suggested that indium is a proper material to be used in effecting a seal. See, for example, U.S. Patent No. 2,984,759; Review of Scientific Instruments, No. 23, 1952 at page 566; and Metals Review of May 1955. Attempts at such utilization have included the application of heat to cause indium metal to flow as well as the application of pressure to cause the relatively soft material to assume the desired conformation.

Difficulties, however, have arisen in that sealing of diverse materials by utilizing indium is made difficult by the tendency of indium to adsorb gas or vapor at its surface. Certain references have suggested the bonding of metals by the use of vibratory energy, as, for example U.S. Patent Nos. 2,946,119, 2,985,954 and 3,184,841. It is felt that the application of vibrations wtih respect to an indium seal would, if effect, scrape away the adsorbed gas which mitigates against forming an effective seal. This invention prescribes sealing two or more diverse components, for example, the face plate and envelope of a pick-up tube by utilizing an indium washer or gasket. A vibratory force is applied during formation to cause removal of adsorbed gases. Heat may be applied of sufficient intensity to cause the indium to become molten, but only for a short period of time so as to negate any disturbance of any photoconductive material which may be applied to the face plate.

Thus, this invention has an as an object the provision of a more effective seal.

A further object is the provision of a seal utilizing an indium washer.

Another object is permitting the manufacture of an indium seal utilizing vibratory forces to remove adsorbed gases from the indium.

These and still further objects and uses will become more apparent on considering the following appended description and drawing in which:

FIG. 1 is a broken vertical section of a generalized tube depicting one method of applying the seal;

FIG. 2 is a section, similar to FIG. 1, showing a second method;

FIG. 2a is a detailed section of one corner of the sealed tube showing a modification of the ring assembly;

FIG. 2b is a detailed section of one corner of the sealed tube showing a further modification of the ring assembly; and FIG. 3 is a further broken section showing still a further method of applying the seal.

Looking first at FIG. 1, an envelope 10 is shown, said envelope normally being of glass and forming the outer surface of a pick-up tube. On final fabrication, interior of member 10 would be the usual electron gun and related control electrodes.

At one end of envelope 10 there is shown window or face plate 11, also usually being essentially glass which rests astride the lip 12 of envelope 10 and is separated therefrom by seal or washer 20. Said seal 20 would be of substantialy pure indium, or of indium alloys containing small amounts, e.g., 1% of other metals such as tin, a relatively soft metal. Shown atop the washer is the aforementioned face plate. The opposite end of the envelope is shown to extend within vessel or tank 13 containing a bath of liquid 14. Within said tank, a generalized source of vibrations is indicated at 30. Such source may be an ultrasonic transducer. Clamp means 31 are shown limiting the motion of envelope 10.

While indium metal is relatively soft, and therefore subject to flow, it does exhibit a tendency to absorb on its surface a film generally including gas and/or water vapor, which, in turn affects the sealing capacity of the metal. On sufficient vibrations being provided, such film may be broken down or negated from affecting the molecular interaction of the diverse components forming the seal. Vibrations may be applied by hand, or at other frequencies. It is simply necessary to have sufficient vibrations for there to be relative movement between engaged surfaces to wipe off the film present thereon. Thus, the ultrasonic vibrations in bath 14, caused by transducer 30 will cause massage or scraping of the indium surface sufficiently to remove such detrimental film, and thereby effect a vacuum tight seal between envelope 10 and face plate 11. It has been found that in a one inch diameter tube, if the face plate weighs at least 5 grams, no additional weight is necessary to satisfactorily deform the indium. It is merely necessary to supply enough force to assure intimate contact between the surfaces.

The embodiment depicted by FIG. 2, includes a washer or ring member 32 circumferentially inserted intermediate face plate 11 and the upper lip of envelope 10. Said ring member includes radially inwardly directed flange 33, substantially overlying said envelope lip 12. Intermediate said flange 33 and said face plate as well as said envelope lip are annular strips of indium foil 21. The thickness of said foil strips may be regulated so as to allow for differences in the coefficient of expansion of the different elements comprising the indium foil, face plate and envelope. Foil having a thickness of from .002 to .005 inch has been found to be effective, although it may be thicker or thinner. Ring member 32 should be non-magnetic and capable of being wetted by indium, as for example, of copper or a CuNi alloy. Surrounding said ring member 32, is induction coil 35. Current may be supplied said coil from a source (not shown) to cause inductive heating of the indium foil. Said foil may thus be brought to its melting point of some 150° C., quickly. Quick current spurts, usually of no more than 2–3 seconds may so raise the indium temperature. When the indium melts the current is discontinued so as to not damage the photoconductive coating on face plate 11, said coating perhaps antimony trisulfide. Further, air blasts may be directed on to the seal to further reduce any excessive heat. While the foil is being caused to flow, ultrasonic vibrations may be provided by member 30, as in FIG. 1.

The modification of FIG. 2a includes respective upwardly and downwardly directed lips 34 on flange 33, making said flange dished in appearance. The quantity of indium foil provided this embodiment may be sufficient to cause a slight overflow by the molten indium. Further, said lips 34 may abut against either or both of face plate 11 and envelope lip 12 on the seal being effected. Otherwise operation of this embodiment is identical to that of FIG. 2. Heat may be provided through coils (not shown), and agitation may be caused by virtue of a source of ultrasonic vibration such as member 30 of FIG. 2.

The modification of FIG. 2b includes the feature of automatically centering the ring member on the envelope, and relative to the face plate. The ring member of this embodiment includes upwardly extending exterior annular flange 36, downwardly extending interior annular flange 37, they being joined by annular neck 38. Said neck may have slightly concave upper and lower surfaces 38a and 38b, forming recesses into which indium foil may be placed for linking said ring to the envelope lip and face plate respectively. The radially inner surface of member 36 centers the face plate with respect to the ring, while the radially outer surface of member 37 centers the ring with respect to the envelope lips. Otherwise, operation is similar to that of FIG. 2a.

The operation of FIG. 3 contemplates envelope 10 having an indium washer provided on its upper lip 12. A face plate 11 may be placed atop said washer. A ring top clamp 40 may engage said face plate. Vibrating means 50, such as a magnetostrictive transducer may direct vibrations in the plane of face plate 11, and thus, cause the destruction of surface film of indium washer 20. Such action may generate enough heat, without using externally applied heat, to make intimate molecular contact between the indium and adjacent surfaces, and thereby remove the surface film, yet keep the face plate cool enough so as not to damage any photoconductive coating provided.

Thus it will be seen that a method and means have been provided for making a more effective seal, a seal using indium metal as a constituent thereof. Such means include a vibratory source with and without additional heat to make the indium molten. Although limited embodiments have been described, it should be obvious that numerous modifications would be possible by one skilled in the art without departing from the spirit of the invention, the scope of which is intended to be limited only by the following appended claims:

1. A method of sealing a tube, comprising the following steps:
   applying a portion of indium to one lip of a glass envelope portion of said tube;
   immersing another lip of said envelope in a liquid bath;
   placing a glass face plate adjacent said indium portion and closely adjacent said envelope lip; and
   causing a vibratory force to clear the indium portion surface of any film present thereon, thereby effecting a seal between said face plate and envelope, wherein said vibratory force is applied by a source of agitation to said bath.

2. A method of sealing a tube, comprising the following steps:
   applying a portion of indium to one lip of a glass envelope portion of said tube;
   placing a glass face plate adjacent said indium portion and closely adjacent said envelope lip; and
   causing a vibratory force to clear the indium portion surface of any film thereon, thereby effecting a seal between said face plate and envelope, heating said indium to its melting point at about the time said vibratory force is caused ot occur.

References Cited
UNITED STATES PATENTS

| | | | |
|---|---|---|---|
| 2,946,119 | 7/1960 | Jones et al. | 29—470.1 XR |
| 2,984,759 | 5/1961 | Vine | 29—504 XR |
| 3,022,814 | 2/1962 | Bodine | 29—470 XR |
| 2,985,954 | 5/1961 | Jones et al. | 29—470 XR |
| 3,051,826 | 8/1962 | Avila | 29—470 |
| 3,184,841 | 5/1965 | Jones et al. | 29—479 XR |
| 3,193,424 | 7/1965 | Scott | 156—73 |
| 3,284,257 | 11/1966 | Soloff et al. | 156—73 |

JOHN F. CAMPBELL, Primary Examiner

R. B. LAZARUS, Assistant Examiner

U.S. Cl. X.R.

29—472.7; 228—1